(12) United States Patent
Herrmann (10) Patent No.: US 7,810,007 B2
(45) Date of Patent: Oct. 5, 2010

(54) DATA PACKET TRANSMISSION

(75) Inventor: Christoph Herrmann, Aachen (DE)

(73) Assignees: Koninklijke Philips Electronics N.V., Eindhoven (NL); Sharp Corporation, Osaka (JP)

( * ) Notice: Subject to any disclaimer, the term of this patent is extended or adjusted under 35 U.S.C. 154(b) by 974 days.

(21) Appl. No.: 10/578,655

(22) PCT Filed: Nov. 3, 2004

(86) PCT No.: PCT/IB2004/052271

§ 371 (c)(1),
(2), (4) Date: May 9, 2006

(87) PCT Pub. No.: WO2005/048517

PCT Pub. Date: May 26, 2005

(65) Prior Publication Data

US 2007/0133605 A1 Jun. 14, 2007

(30) Foreign Application Priority Data

Nov. 12, 2003 (EP) .................................. 03104171

(51) Int. Cl.
*G06F 11/00* (2006.01)
(52) U.S. Cl. .................. 714/746; 714/751; 714/712
(58) Field of Classification Search .................. 714/746, 714/748, 751, 752, 758, 701, 703, 712, 48, 714/49, 50, 56, 755, 52; 370/389, 392, 200
See application file for complete search history.

(56) References Cited

U.S. PATENT DOCUMENTS

| 6,622,277 B1 * | 9/2003 | Ramanujam et al. ........ 714/755 |
| 7,020,809 B2 * | 3/2006 | Kleppel et al. .................. 714/52 |
| 7,310,336 B2 * | 12/2007 | Malkamaki .................. 370/392 |
| 2003/0031119 A1 * | 2/2003 | Kim et al. .................... 370/200 |

FOREIGN PATENT DOCUMENTS

| EP | 0735774 A2 | 10/1996 |
| EP | 1069735 A2 | 1/2001 |
| WO | 02096006 A2 | 11/2002 |

OTHER PUBLICATIONS

John G. Waclawsky, Ashok K. Agrawala, Dynamic Queue Behavior in Network Window Protocols, 1990; University of Colorado, Boulder, Colorado, United States; pp. 261-262.*
3rd Generation Partnership Project; Technical Specification Group Radio Access Network; Multiplexing and Channel Coding (FDD) (Release 5) ; Technical Specification; 3GPP TS 25.212 V5.2.0 (Sep. 2002). XP-002270602.

* cited by examiner

*Primary Examiner*—Fritz Alphonse (57) ABSTRACT

Using the attribute "priority" to achieve a stronger Forward Error Correction (FEC) for Radio Link Control (RLC) Control Protocol Data Units (PDUs) transmitted via the High Speed Downlinik Shared Channel (HS-DSCH) also entails prioritized handling so that an RLC Control PDU is likely to overhaul an RLC Data PDU. As a consequence the RLC protocol operation can severely be disturbed, since it relies on in-sequence delivery of control and data PDUs. According to an exemplary embodiment of the present invention, two types of containers are provided in which data packets may be transmitted, wherein the first type of container is provided with a stronger error coding than the second type of container and wherein data packets which comprise control instructions are only transmitted in the first container type with the stronger error correction. Due to this, an improved forward error correction for control PDUs of the AM RLC protocol of Universal Mobile Telecommunications System (UMTS) may be provided.

12 Claims, 3 Drawing Sheets

DATA PACKET TRANSMISSION

The present invention relates to the field of data transmission where data packets are transmitted from a transmitting station to a receiving station or exchanged between both. In particular, the present invention relates to a method of transmitting data packets from a transmitting station to a receiving station, to a data communication system for transmitting data packets from a transmitting station to a receiving station, to a transmitting station for a communication system, to a receiving station for a communication system and to a software program product for performing a transmission of data packets from a transmitting station to a receiving station.

A method for transmitting data packets between a transmitter and a receiver as well as a corresponding data transmission system is, for example, described in 3GPP TS 25.308 V5.2.0 (2002-03), Technical Specification, 3rd Generation Partnership Project; Technical specification Group Radio Access Network; High Speed Downlink Packet Access (HSDPA); Overall description; Stage 2 (Release 5) and 3GPP TS 25.321 V5.2.0 (2002-09) Technical Specification 3rd Generation Partnership Project; Technical Specification Group Radio Access Network; MAC protocol specification (Release 5), which are both hereby incorporated by reference.

According to this method, data is transmitted in the downlink, i.e. from the UMTS transmitter in the Node B to the receiver in the UMTS mobile station or UE (user equipment) via the high speed downlink shared channel (HS-DSCH) at high speed. In a sub-layer of the MAC layer, the so-called MAC-hs layer (hs: high speed), a HARQ retransmission protocol controls the retransmission of MAC-hs PDUs. At the receiver in the mobile station, the soft-bits of a retransmitted MAC-hs PDU are soft-combined with the soft-bits of an earlier transmission of this MAC-hs PDU. The MAC-hs layer is located on the Node B. The peer entities of the HARQ retransmission protocol are hence located on the Node B and the mobile station or UE.

In addition to the HARQ retransmission protocol (in the following referred to as second retransmission protocol), there is another protocol, which is relevant in the context of the present invention: It is the so-called Radio Link Control (RLC) protocol (in the following referred to as first retransmission protocol), the peer entities of which are located on the mobile station's serving RNC (radio network controller) and the mobile station. For the details of the Radio Link Control protocol (RLC protocol) e.g. acknowledged mode (AM) and unacknowledged mode (UM) data transmission, 3GPP TS 25.322 V5.2.0 (2002-09) Technical Specification 3rd Generation Partnership Project; Technical Specification Group Radio Access Network, which is herewith incorporated by reference.

This RLC protocol is in charge of
  performing segmentation of RLC SDUs (service data units, i.e. data units, which are received from the next higher layer above the RLC layer) into fragments, which are sent as part of an RLC PDU (protocol data unit, i.e. a data unit, which the RLC layer hands down to the next lower layer, which is here the MAC layer), and, if applicable, concatenation of different RLC SDUs or fragments of different RLC SDUs into RLC PDUs, and
  (if configured accordingly) controlling retransmission of RLC PDUs, which the receiver indicates to the transmitter as not having been correctly received.

If data is transmitted via the HS-DSCH, this data is also always processed by an RLC protocol entity above the HARQ protocol, and this RLC protocol entity can then (i.e. if data is transmitted via the HS-DSCH) be configured for Acknowledged mode (AM) data transmission, or
Unacknowledged mode (UM) data transmission.

"Acknowledged mode data" is also abbreviated by AMD, "Unacknowledged mode data" by UMD.

In both UMD and AMD transmission, the RLC PDUs have a sequence number, where UM prescribes 7 bits and AM prescribes 12 bits for coding the sequence number. This corresponds to a sequence number range from 0 to 127 for UM, and from 0 to 4095 for AM. If configured for AMD transmission, the RLC protocol performs segmentation (and, if applicable, concatenation) of RLC SDUs into RLC PDUs, and improves reliability of data transmission by performing retransmissions. If configured for UMD transmission, the RLC protocol only performs segmentation and, if applicable, concatenation.

On the transmitting side, an RLC PDU is further processed by the MAC layer, or more precisely the MAC-d layer, which may add a MAC header, if logical channels have to be distinguished. This MAC header identifies the logical channel, on which the RLC PDU is transmitted. The MAC-d PDU (i.e. the protocol data unit produced by the MAC-d layer) is then delivered to the MAC-hs layer located on the Node B of the UMTS. Here, one or more MAC-d PDUs destined for the same mobile station are compiled into a MAC-hs PDU. These MAC-d PDUs may belong to different logical channels, i.e. have different MAC headers. Hence, the MAC-hs PDU multiplexes MAC-d PDUs of different logical channels, however, for the same receiving mobile station. In contrast to that, one MAC-d PDU always contains exactly one RLC PDU.

A MAC-hs PDU compiled from one or more MAC-d PDUs, is further processed by the physical layer. Generally, the data units, which the physical layer processes in the context of the HS-DSCH, are called transport blocks, i.e. a MAC-hs PDU is also a transport block, and the count of bits, which form the transport block (i.e. here the MAC-hs PDU), is called the transport block size. The physical layer processing of the transport block of type MAC-hs PDU is as follows:

The physical layer adds a cyclic redundancy check (CRC) sum (of 24 bit) and after this applies rate-⅓-turbo-coding to the bits of the transport block (of type MAC-hs PDU) and the CRC bits, i.e. adds parity bits resulting from the turbo coding, as described in 3GPP TS 25.212 V5.2.0 (2002-09), 3rd Generation Partnership Project; Technical Specification Group Radio Access Network; Multiplexing and channel coding (FDD) (Release 5), which is herewith incorporated by reference.

Furthermore, rate matching is applied, as described in TS 25.212 V5.2.0, which adjusts the number of bits, which are output of the rate-⅓-turbo-coder to the number of bits, which can be transmitted within 2 ms via the air interface. The number of bits, which can be transmitted within 2 ms via the air interface, depends on the chosen number of channelization codes (1 to 15 can be used, and they all have a spreading factor of 16) as well as on the chosen modulation scheme, which can be QPSK (Quaternary phase shift keying) or 16 QAM (Quadrature Amplitude Modulation). E.g. the number of bits, which can be transmitted in 2 ms with 16 QAM, is by a factor of 2 bigger than the number of bits, which can be transmitted with QPSK.

Rate matching can e.g. mean puncturing, i.e. deleting predefined bits in the sequence of bits, which is output of the rate-⅓-turbo-coder, such that the resulting number of bits exactly fits the number of bits, which can be sent over the air interface within 2 ms. The receiving side knows the positions of the punctured bits, and considers them in the decoding process e.g. as bits with value zero.

If puncturing has to be applied, the forward error protection (FEC) necessarily becomes weaker than without puncturing. Puncturing may be avoided, e.g. if one or more additional channelization codes are used for the transmission over the air interface.

For a considered MAC-hs PDU, a specific type of rate matching is applied, and one of the modulation schemes QPSK and 16 QAM may be selected. This combination of rate matching and modulation scheme may also be referred to as coding and modulation scheme.

TS 25.212 V5.2.0 describes some further steps of the physical layer processing of a transport block of MAC-hs type, which may not be important in the context of the present invention.

The period of 2 ms is also called the transmission time interval (TTI) of the HS-DSCH. Since it is equal to the periodicity, at which a transport block (of MAC-hs type) is transferred by the physical layer on the radio interface, it also corresponds to the inter-arrival time of a transport block (of MAC-hs type) at the physical layer, i.e. the time between consecutive deliveries of data between the MAC layer and the physical layer. In other words, the physical layer processes within a TTI of 2 ms a container of bits, i.e. the MAC-hs PDU bits, and is ready after 2 ms to process the next container of bits. In principle due to CRC attachment and channel encoding by means of turbo coding, the number of bits, which are then sent over the air interface, is greater than the number of bits of the container. If the number X of bits, which the physical layer can transmit over the air interface (after turbo encoding) within the TTI of 2 ms is kept fixed for two containers of different size (i.e. different number of bits), where the container sizes are smaller than X minus 24 (corresponding to the 24 CRC bits), the FEC of the smaller container is stronger than that of the bigger container, e.g. since less puncturing would be applied for the smaller container. Likewise, if a container of a given size S is transmitted after physical layer processing once with X bits (X>S+24) over the air interface, and once with Y>X bits over the air interface, the FEC is usually stronger, if Y bits are used for transmission over the air interface.

In the following, in conjunction with UMTS, the term "container" denotes the bits of the MAC-hs PDU, i.e. of the transport block of MAC-hs PDU type.

In accordance with the HARQ protocol in MAC-hs of the UMTS in release 5 as cited above, it is assumed to accept loss of a MAC-hs PDU (Protocol Data Unit, i.e. a data packet which is handed from a protocol layer to a underlying protocol layer) for which a maximum number of retransmissions was reached without success in the last retransmission, i.e. without being able to decode the received MAC-hs PDU error-free. In that case, the transmission of this MAC-hs PDU is aborted and all the RLC-PDUs contained in it are discarded. As a consequence, these lost RLC-PDUs have to be retransmitted on RLC protocol level (which means that retransmissions are performed by the RLC protocol, and that the retransmitted PDUs are the RLC PDUs) resulting in a considerable delay since the Iub and Iur interfaces between Node B and the DRNC and the DRNC and the SRNC, respectively, have to be passed. The DRNC is also referred to as drift RNC (Radio Network Controller). A mobile station which has left the serving area of its respective serving RNC (SRNC) is located in a cell served by another RNC. This other RNC may be then referred to as drift RNC of the considered mobile station.

The RLC (Radio Link Control) protocol of UMTS allows for configuring an AM (Acknowledged Mode) RLC entity to use two logical channels to transmit RLC PDUs (RLC Protocol Data Units) depending on their type, i.e. in order to provide one logical channel for transmission of RLC Data PDUs, and one logical channel for transmission of RLC Control PDUs. Since the logical channels can be mapped to transport channels with different FEC (Forward Error Correction), it is thus possible to provide a logical channel with stronger FEC (Forward Error Correction) for RLC Control PDUs, which are not subject to retransmissions, and at the same time are most important for a correct functioning of the RLC protocol.

If data is to be transmitted via the HS-DSCH (High Speed Downlink Share Channel) with an AM RLC protocol running on top, since there is only one transport channel of type HS-DSCH, logical channels cannot be mapped to different transport channels (with e.g. different FEC), but only to different priority classes in the MAC-hs entity on NodeB. MAC-hs on the NodeB has only this priority information, and no information about the importance of a data packet, which could then indicate to the NodeB the need for applying a more robust MCS (Modulation and Coding Scheme). Using the attribute "priority" to achieve a stronger FEC also entails prioritized handling so that an RLC Control PDU is likely to overhaul an RLC Data PDU. As a consequence the RLC protocol operation can severely be disturbed (e.g. if a MRW-Control PDU is transmitted, or an RLC RESET procedure is triggered), since it relies on in-sequence delivery of control and data PDUs.

It is an object of the present invention to provide for an improved transmission of data packets containing control information.

According to an exemplary embodiment of the present invention as set forth in claim 1, a method is provided for transmitting first data packets and second data packets from a transmitting station to a receiving station. The first data packets comprise first data, in particular control instructions and the second data packets comprise second data. Furthermore, the first data packets and the second data packets are transmitted from the transmitting station to the receiving station in containers. According to this exemplary embodiment of the present invention, a first container comprises at least one first data packet and is provided with a first error coding. On the other hand, a second container comprises at least one second data packet and no first data packet and the second container is provided with a second error coding. The first error coding is stronger than the second error coding.

In other words, two types of containers are provided, in which first and second data packets may be transmitted. The first type of container is provided with a stronger error coding than the second type of container and data packets which comprise control instructions are only transmitted in the first type of containers with the stronger error correction. Control instructions may be control instructions related to the first retransmission protocol.

Transmitting the first data packets, which comprise in particular control instructions, only in the first type of container, which is provided with a stronger error coding or error correction than the second type of container may increase the rate of error-free transmission of data packets which comprise control instructions, i.e. the first data packet.

There may be different types of control instructions, some for which it is important that they are not lost, and others for which loss can be tolerated from time to time or more often than for the important control instructions, and which may be transmitted more frequently.

According to another exemplary embodiment of the present invention the second data packets do not only comprise data, but also those control instructions, the loss of which may be tolerated from time to time, and which may be transmitted more frequently.

In UMTS Release 99, 4, and 5, these most important control instructions, the loss of which should be avoided as much as possible may be the following:

RESET PDU and RESET ACK PDU,

STATUS PDU containing an MRW SUFI (Move Receiving Window Super Field), and STATUS PDU containing an MRW_ACK SUFI (Move Receiving Window Acknowledgement Super Field), STATUS PDU, which contains a WINDOW SUFI (i.e. a super field by which the Receiver of the RLC protocol tells the Sender to change the transmission window, especially to reduce its size.

Less important control instructions, the loss of which can be tolerated from time to time or more often than the loss of the important control instructions, are the remaining RLC Control PDUs as defined in TS 25.322, i.e. in particular a STATUS PDU, does not contain a MRW SUFI, or MRW SUFI ACK, but which carries information on RLC PDUs, which the RLC entity, which sends the STATUS PDU, received correctly or is still expecting to be transmitted.

According to another exemplary embodiment of the present invention as set forth in claim 2, the number of first and second data packets in the first container is smaller than the number of second data packets in the second container such that a first data payload transmitted in the first container is lower than a second data payload transmitted in the second container.

In other words, first data packets are transmitted together with second data packets in the first container, the error protection of which is stronger than the error protection of the second container, which exclusively contains second data packets. According to this exemplary embodiment of the present invention, this improved error protection is achieved by reducing the number of first and second data packets contained in the first container, whilst keeping the overall number of bits constant, which are sent over the air interface for this first container after channel coding and rate matching. In other words, the data payload contained is reduced and e.g. a number of parity information bits (parity bits) is increased. In case of a fixed number of coded bits, which are transmitted via a radio interface, the number of parity bits per payload bit (which is contained in a first or second data packet), and thereby the FEC, increases as the number of payload bits decreases.

The term data payload relates to the data which is actually transmitted (relating to control instructions or e.g. user data) and not to bits used for achieving this transmission, i.e. physical layer bits sent over the air interface, which include parity bits.

According to another exemplary embodiment of the present invention as set forth in claim 3, a first retransmission protocol controls a transmission or retransmission of a third data packet of the first and second data packets and a second retransmission protocol controls a transmission or retransmission of the first and second containers. Furthermore, the first container and the second container are provided with a corresponding container sequence number and each data packet of the second data packets is provided with a corresponding data packet sequence number. According to this exemplary embodiment of the present invention, a first order or sequence of the first and second data packets which results when the first and second data packets are sent in first and second containers remains unchanged compared with a second order or sequence of the first and second data packets with which the first and second data packets are received by the second retransmission protocol.

In other words, the first and second containers always comprise first and second data packets in such a way that there is no sequence alteration in the progression of the first and second data packets, in which they are sent by the second retransmission protocol over the air interface. However, second data packets may thereby be missing, since they got lost on account of unfavorable channel conditions, as the case may be.

According to another exemplary embodiment of the present invention as set forth in claim 4, a second retransmission protocol determines whether a fourth data packet, which the second retransmission protocol receives from the first retransmission located above the second retransmission protocol is a first data packet or a second data packet.

According to another exemplary embodiment of the present invention as set forth in claim 5, the second retransmission protocol performs the determination whether the fourth data packet is a first data packet or a second data packet by analyzing a header information, which is associated with the fourth data packet by the first retransmission protocol. This determination may be performed by means of a scheduler, which reads the header information of every first and second data packet received, in order to determine on the basis of the first bit of this header, whether the data packet is a first data packet comprising control instructions or a second data packet comprising data.

According to another exemplary embodiment of the present invention as set forth in claim 6, the fourth data packet is labeled when carried from a first transmission protocol to a second transmission protocol, which first transmission protocol is located above the second transmission protocol, if the fourth data packet is a first data packet.

In other words, according to this exemplary embodiment of the present invention, a first data packet may be transmitted on a different logical channel than the second data packets and therefore a frame protocol for the transmission of data packets between the network node implementing the first transmission protocol and the network node implementing the second transmission protocol or a similar entity may determine from the respective logical channel, whether the data packet comprises control instructions or non-control data. Then the frame protocol marks a data packet comprising control information (which is a first data packet per definition) in such a way that the second transmission protocol can immediately recognize, without analysis of the header, which of the received data packets is a first data packet and which is a second data packet.

According to another exemplary embodiment of the present invention as set forth in claim 7, the method is applied for data transmission over the high speed downlink shared channel in UMTS.

According to another exemplary embodiment of the present invention as set forth in claim 8, the first data packets are RLC Control PDUs and the second data packets are RLC Data PDUs.

According to another exemplary embodiment of the present invention as set forth in claim 9, a first retransmission protocol controls a transmission or retransmission of a third data packet of the first and second data packets and a second retransmission protocol controls a transmission or retransmission of the first and second containers. Furthermore, the first container and the second container are provided with a corresponding container sequence number and each data packet of the second data packets is provided with a corresponding data packet sequence number, and the receiving entity of the first retransmission protocol discards second data packets, the sequence number of which is outside the receiving window. According to this exemplary embodiment of the present invention, the first peer entity of the two peer entities of the first retransmission protocol may initiate a reset of both peer entities, which reset is done by means of a first and second reset message of the first data packets, which reset causes the first entity to send a first reset message to the second entity, and the second entity to send a second reset message to the first entity in reply to the first reset message, which first reset message sets the lower edge of the receiving window of the second entity equal to the lower edge of the transmission window of the first entity, which lower edge was used before the reset, which second reset message sets the lower edge of the receiving window of the first entity equal to the lower edge of the transmitting window of the second entity, which lower edge was used before the receipt of the first reset message. It has to be noted that according to this exemplary embodiment a peer entity may be a receiving entity or a transmitting entity of the retransmission protocol.

Due to resetting the first retransmission protocol by means of reset messages, as defined in the above manner, it may be achieved that even if first data packets, and in particular the first data packet(s) containing the reset messages, overtake second data packets, the receiving entity of the first retransmission protocol will not accept any second data packets, which were not sent by the sending entity of the first retransmission after the reset. This may allow that the disturbance of the reset is kept to a minimum, in particular that the service data units of the layer implementing the first retransmission protocol are reassembled from invalid segments contained in second data packets received after the reset, which second data packets were sent before the reset and have become obsolete due to the reset.

According to another exemplary embodiment of the present invention as set forth in claim 10, a communication system for transmitting first data packets and second data packets from a transmitting station to a receiving station is provided, wherein the first data packets comprise first data, in particular control instructions and the second data packets comprise second data. Also, according to an aspect of this exemplary embodiment of the present invention, the first data packets and the second data packets are transmitted from the transmitting station to the receiving station in a first container and a second container, wherein the first container comprises at least one first data packet and wherein the second container comprises at least one second data packet and no first data packet. Furthermore, the first container is provided with a first error coding and the second container is provided with a second error coding, wherein the first error coding is stronger than he second error coding.

According to another exemplary embodiment of the present invention as set forth in claim 11, a transmitting station for transmitting first data packets and second data packets from the transmitting station to the receiving station is provided, allowing for a transmission of first and second containers, which comprise first and second data packets, wherein the first container comprises at least one first data packet and wherein the second container comprises at least one second data packet and no first data packet and wherein the first container is provided with a stronger error coding than the second container.

According to another exemplary embodiment of the present invention as set forth in claim 12, a receiving station for receiving first data packets and second data packets from a transmitting station is provided, wherein the receiving station is adapted to receive different types of containers, which are provided with error coding of a different strength.

According to another exemplary embodiment of the present invention as set forth in claim 13, a software program product is provided for a data processor, for example in a communication system, for performing a transmission of first data packets and second data packets from a transmitting station to a receiving station. The software program product according to the present invention is preferably loaded into a working memory of the data processor. The data processor is equipped to carry out the method of the present invention, for example, as described in claim 1. The software program product may be stored on a computer readable medium, such as a CD-ROM. The computer program may also be presented over a network, such as the WorldWideWeb, and may be downloaded into the working memory of the data processor from such a network.

It may be seen as the gist of an exemplary embodiment of the present invention that two types of containers are provided in which data packets are transmitted, wherein the first type of container is provided with a stronger error coding than the second type of container and wherein data packets which comprise control instructions for the transmission or the system are only transmitted in the first container type with the stronger error correction. Due to this, according to an exemplary embodiment of the present invention, an improved forward error correction for control PDUs of the AM RLC protocol of UMTS may be provided AM data is transmitted via the H-DSCH.

These and other aspects of the present invention will become apparent from and elucidated with reference to the embodiments described hereinafter.

Exemplary embodiments of the present invention will be described in the following, with reference to the following drawings.

Figure 1:
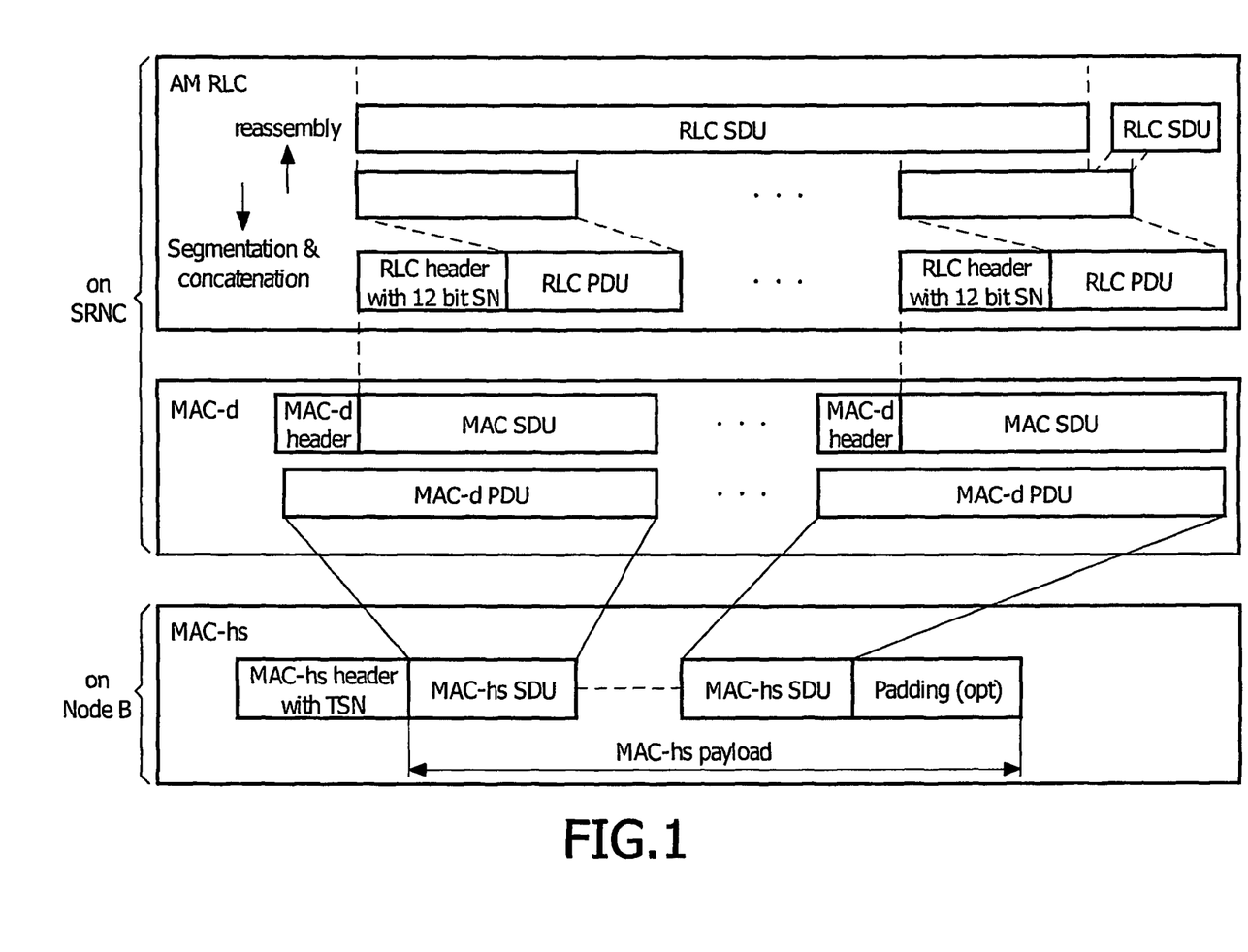
FIG. 1 shows an exemplary embodiment of layers of a transmitter or receiver of a data transmission system according to the present invention.

FIG. 1 shows a simplified representation of layers of a transmitter or a receiver according to exemplary embodiments of the present invention as they may be applied in an exemplary embodiment of a transmission system according to the present invention. According to a preferred embodiment of the present invention, the data transmission system and therewith the transmitter and receiver according to exemplary embodiments of the present invention are arranged in accordance with 3GPP TS 25.308 V5.4.0 (2003-03), Technical Specification, 3rd Generation Partnership Project; Technical specification Group Radio Access Network; High Speed Downlink Packet Access (HSDPA); Overall description; Stage 2 (Release 5) and 3GPP TS 25.321 V5.5.0 (2003-06) Technical Specification 3rd Generation Partnership Project;

Technical Specification Group Radio Access Network; MAC protocol specification (Release 5), which are both hereby incorporated by reference.

In accordance with the above technical specifications, in the HS-DSCH (High Speed Downlink Shared Channel) different container sizes are defined. In other words, the container size denotes the number of bits, which the physical layer receives from the MAC layer and which are then transmitted via the air interface after CRC attachment, and error correcting encoding including an addition of parity or error protection bits and applying of rate matching as defined in the above technical specifications. In case there are good channel conditions on the radio channel, a relatively large container may be transmitted error-free with a high probability from the transmitter to the receiver. However, in case there are difficult or bad channel conditions, a small container size has to be selected in order to maximize the probability of a successful transmission.

Figure 2:
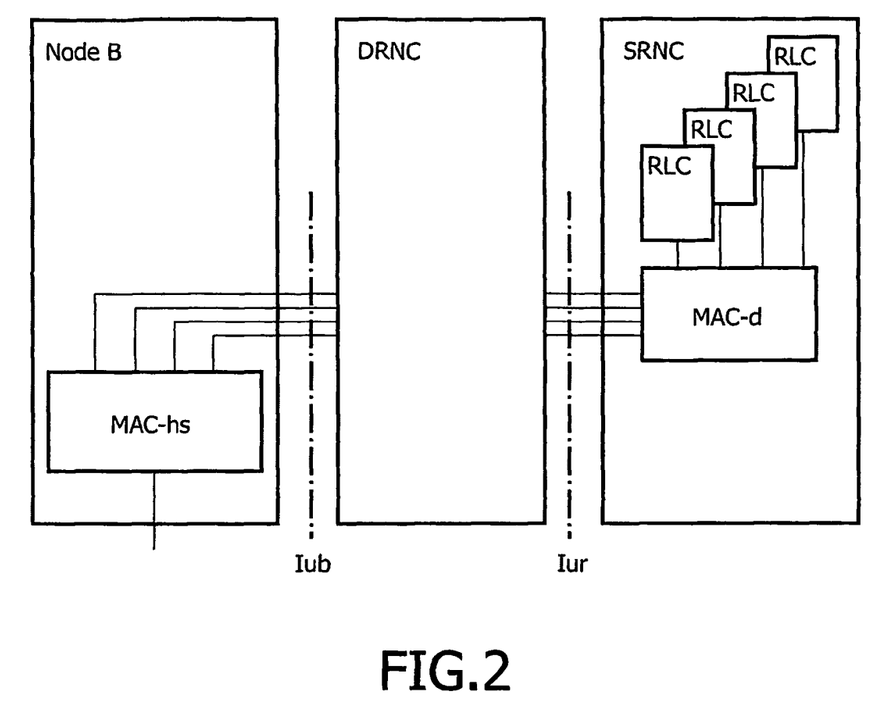
FIG. 2 shows a simplified representation of Node B, DRNC and SRNC as may be used in the data transmission system according to the present invention, e.g. in UMTS.

In the RLC protocol on the RNC (Radio Network Controller), data packets such as RLC SDUs (service data units), which were received from the layer above the RLC layer, are segmented into parts having a predetermined segmentation size. In general, a service data unit (SDU) of a considered protocol layer is defined in the relevant literature as a data unit, which this considered protocol layer receives from the next higher protocol layer. The considered protocol layer processes the SDU, which in case of the RLC protocol means e.g. that the SDU is segmented into fragments. As a result of the protocol processing, the SDU is transformed into one or more PDUs (protocol data units), which in case of the RLC protocol then e.g. contain each one fragment of the segmented SDU. If concatenation is possible, more than one fragment is contained. These fragments are provided with an RLC header, which contains at least a sequence number, and form the payload or content of an RLC PDU. In general, PDUs of a considered protocol layer are defined as the data units, which the considered protocol layer delivers to the next lower protocol layer. These RLC PDUs are processed in the MAC-d layer in which they may, for example, be provided with a MAC header. Then the RLC PDUs (with or without MAC header) are handed as MAC-d PDUs to a subjacent protocol layer. In case of a data transmission via the HS-DSCH, this subjacent protocol layer is the MAC-hs layer which, as may be taken from FIG. 2 is located on the Node B.

As may be taken from FIG. 1, the MAC-hs layer processes the received MAC-d PDUs which respectively contain exactly one RLC-PDU (FIG. 1 considers the case of AM, the same holds for UM) and puts them in MAC-hs PDUs for transmission via the HS-DSCH, and then via the radio interface or air interface. For example, the MAC-hs layer may decide on the basis of a channel quality estimation which container size, i.e. which MAC-hs PDU size should be selected for the next MAC-hs PDU which is sent on the HS-DSCH via the air interface. Given the RLC-PDU size (which then also determines the size of the respective MAC-d PDU) a MAC-hs PDU may, depending on the selected size of the container, contain a plurality of MAC-d PDUs (and therewith RLC-PDUs).

The segmentation size is given by the so-called RLC PDU size minus the bits for the header of the RLC PDU. The size of the MAC-d PDU may be determined from a sum of the RLC PDU size, and the size of the MAC header. In the other channels, except for the HS-DSCH, the size of a MAC-d PDU is usually identical to the container size, whereas in the case of the HS-DSCH, this requirement of the identical size does not exist. Rather, in case of the HS-DSCH, the size of the MAC-hs PDU corresponds to the container size, and the MAC-hs PDU can consist of several MAC-d PDUs.

The container size or MAC-hs PDU size to be used for transmitting a MAC-hs PDU via the HS-DSCH has to be adjusted according to the current channel conditions, i.e. for good channel conditions the container size can be big, while it has to be small for bad channel conditions, in order to achieve a reasonably high probability for achieving an error-free transmission of the MAC-hs PDU. For the following reasons, it is usually not possible to change the RLC PDU size in AM or UM in order to take the channel conditions into account.

When transmitting data in AM, where transmissions and retransmissions are performed in RLC PDUs with sequence numbers ranging from 0 to 4095, the size of the RLC-PDU may only be varied or changed by means of a relatively time consuming reconfiguration of the transmitter side and receiver side RLC machines or RLC entities. Such a reconfiguration may take between 100 and 200 ms. When transmitting data packets in UM, where no retransmissions are performed and the containers are used having sequence numbers ranging from 0 to 127, the size of the RLC PDU may be modified without such a time consuming reconfiguration. However, the RLC protocol in the UTRAN is located on the RNC which is generally connected to the Node B via a DRNC. A DRNC is a drift RNC. In this case, as may be taken from FIG. 2, two interfaces have to be passed: namely, Iur, which is located between the SRNC and DRNC, and Iub, which is located between the DRNC and the Node B. This may cause delays.

Furthermore, usually for transmitting data from the RNC to the Node B, half the round trip time is required. The full round trip time relates to the time from the transmission of data from the RNC to a UE or mobile station until the receipt of a response in the RNC. Usually, the full round trip tine is in the range of 100 ms (in the worst case). In other words, a data transmission between the RNC and the Node B may require up to 50 ms. Due to this long data transmission time, the RLC PDU size may not be changed very rapidly in the case of UM data transmission. A control message sent from the Node B to the SRNC which would indicate to the respective RLC machine on the SRNC that from now on, for example, a doubled RLC PDU size may be possible, would reach the RLC machine only after up to 50 ms. Also it would require another time duration of up to 50 ms until the RLC PDUs (packed into a MAC-d PDU) having this changed size are received in the MAC-hs layer.

Since, however, the radio channel may drastically change much faster, an adjustment of the container size, i.e. the size of the MAC-hs PDUs to the actual channel conditions has to be accomplished as fast as possible by changing the RLC PDU size for UM or AM. Otherwise, the amount of retransmissions on the MAC-hs level increases significantly when the container size is selected too big due because the RLC PDU size of one or more RLC PDUs to be carried in the container was chosen too big.

Due to the reasons described above, it may also be advantageous to choose the RLC PDU size in acknowledged mode (AM) as well as in unacknowledged mode (UM) such that a single RLC PDU or a very small number of RLC PDUs may be accommodated in the smallest container, for which a reasonably high probability of a successful transmission can be assumed, also in very bad channel conditions.

MAC-hs PDUs are transmitted via the radio interface with a priority class indicator (8 different priority values), i.e. this indicator in turn represents a channel-like bundling, whereby these thus defined 8 channels differ from each other only in priority. By the definition of a mapping between the MAC-d Flows, via which the MAC-hs on the Node B receive MAC-d PDUs, and the logical channels within a MAC-d Flow on the one hand and these priority classes on the other hand, the Scheduler may assign the MAC-d PDUs of the individual logical channels to the individual priority classes and transmit them in MAC-hs PDUs of the necessary priority. During the data transmission in the RLC AM, in addition to the RLC data PDUs, RLC Control PDUs are also exchanged between transmitter and receiver, by means of which the RLC protocol from both the transmitter and the receiver may be controlled. For example, the transmitter may initiate an RLC RESET by means of the transmission of an RLC RESET PDU, i.e. the receiver assigns configurable parameters to its initial value and cancels all remaining RLC PDUs and RLC SDUs. Likewise, the same procedure may be carried out on the side of the transmitter.

The RLC protocol was developed on the assumption that the sub layer transmits PDUs to the receiving side in the sequence in which they were sent off on the side of the transmitter. RLC Control PDUs are of great significance for the correct functioning of the AM RLC protocol. For this reason, it is of utmost importance that RLC Control PDUs are not lost in the radio interface. Thus, UMTS Release 99 provides that RLC PDUs may be transmitted on two different logical channels, whereby one logical channel is used exclusively for RLC Control PDUs and this logical channel is carried by a transport channel with particularly good FEC (Forward Error Correction). In order to avoid altering the original sequence of transmitted RLC Control PDUs and RLC Data PDUs, both logical channels must have the same priority. Although they are thereby sent via two different Service Access Points from the RLC-layer to the MAC-layer, they are nevertheless inserted into the MAC-layer in the same queue as prescribed for this priority. On the assumption that the RLC-layer sends the RLC Data PDUs and the RLC Control PDUs to the MAC-layer in succession via the respective Service Access Points, it may be guaranteed that RLC Data PDUs and RLC Control PDUs appear in the waiting queue in the actual sequence in which they were sent by the RLC-layer to the MAC-layer.

Example to elucidate the problems resulting from sequence changes:

Difficulties may arise from sequence changes, for example, in the case that an RLC RESET PDU were to overtake an RLC Data PDU which was sent before it, as elucidated in the following by means of the HS-DSCH (High Speed Downlink Shared Channel):

In the case of an RLC Reset, (amongst other things),
all RLC Reset parameters are initialized with their configured parameters (i.e. the sequence number begins again from 0, the transmission, respectively receiver window is set so that the lower limit is 0, i.e. the receiving window comprises the sequence numbers 0, 1, . . . , Configured_Rx_Window_Size-1), where Configured_Rx_Window_Size denotes the configured receiving window size, and the transmitting window comprises the sequence numbers 0, 1, . . . , VT(WS)-1, where VT(WS) is the transmission window state variable, which stores the currently configured transmission window size.
all RLC PDUs in the AM RLC machine (and then also in the received AM RLC machine) are deleted;
all remaining RLC SDUs sent before the reset are deleted on the side of the transmitter and the receiver.

These steps will be triggered if an RLC machine receives a RESET PDU. Furthermore, these steps will be triggered in the RLC-machine initiating the RESET, if it receives a RESET ACK PDU in answer to the RESET PDU. The initiating RLC machine transmits no further RLC PDUs after having sent a RESET PDU.

One reason for the initiation of an RLC Reset may be the reaching of the maximum number of transmission repetitions for an RLC PDU. Since both the releasing RLC machine and its peer entity must carry out the steps mentioned above, it is immaterial for the described problem whether the RLC Reset is initiated by means of an RLC machine on the SRNC or on the UE.

After the successful completion of an RLC RESET procedure, transmitting and receiving RLC machines which, in the present exemplary embodiment where an UMTS system is considered, receive their data via the HS-DSCH, delete the stored RLC PDUs from the time prior to the RLC RESET. In most cases, some of these RLC PDUs, which have already been sent, but for which no acknowledgement has been received, (after the RLC RESET) are still stored in the MAC-hs layer on Node B, in so far as they could not yet be transmitted error free to the MAC-hs level, and to be precise then, when, as usual, RLC Control PDUs (including the RESET PDU and RESET ACK PDU) are transmitted via another higher priority logical channel as RLC Data PDUs, so that an RESET PDU or RESET ACK PDU overtakes the stored data PDUs. However, after the RLC RESET, the RLC PDUs still stored in MAC-hs are no longer of any value for the data transmission, since the receiver no longer expects them. They are defined here as "orphan RLC PDUs". After the RLC RESET, the "orphan RLC PDUs" are usually transmitted via the HS-DSCH. If their sequence numbers are outside the reception window initialized by the RESET, they will be rejected by the receiving RLC machine according to the defined error handling. If, on the other hand, they are within the reception window, then the receiving RLC machine accepts them erroneously as valid RLC PDUs. Since, however, they are orphan RLC PDUs, they were never sent from the transmitting RLC machine after the RESET. However, after the RLC RESET, the transmitting RLC machine on the SRNC will send "genuine" RLC PDUs under the same sequence numbers, which then only ever reach the receiver side after the "orphan RLC PDUs". These "genuine" RLC PDUs are then interpreted as duplicates by the receiver side and are therefore rejected. Amongst the remaining sequence numbers of the reception window, the receiver side in turn receives "genuine" RLC PDUs. However, the reassembling of the SDU segments received in the RLC PDUs to the RLC PDUs now fails, since the "orphan RLC PDUs" do not contain valid SDU segments. The consequence in many cases is the loss of several of the RLC SDUs, which were transmitted after the RLC RESET, in fact by far exceeding those RLC SDUs already lost through the RLC RESET. The number of these RLC SDUs additionally lost after the RLC RESET depends to a great extent on the size of the reception window, since the size determines on the one hand the risk that certain amongst the "orphan RLC PDUs" will have a sequence number within the reception window initialized after the RESET. On the other hand, the size of the transmission window (of the transmitting RLC machine on the SRNC) determines the number of possible "orphan RLC PDUs"; usually, reception and transmission windows of the same size are selected.

In addition, it can happen after the reception of "orphan RLC PDUs" with sequence numbers within the reception window which was initialized by the RESET, that a status report acknowledges the correct reception of an "orphan RLC PDUs", while the transmitting side has not yet sent a "genuine RLC PDU" with the sequence number of this "orphan RLC PDU", i.e. the status report indicates the error-free reception of an RLC PDU, which the transmitting side has not yet sent. According to the defined error handling, in some cases, this can lead to an additional RESET procedure initiated by the transmitting side according to the criteria of the "erroneous sequence number" as described in section 10.1 of TS 25.322, causing additional interruption of the data transmission for the logical channel that carries the AM RLC PDUs.

The STATUS PDU containing an MRW SUFI (Super Field) may not cause similar problems, if it can overtake normal RLC Data PDUs:

The STATUS PDU containing an MRW SUFI is used in the context of the "SDU discard with explicit signaling" procedure. This procedure is used in AM for discarding RLC SDUs on the transmitting side (in other words Sender of the AM RLC protocol) and transferring the discard information to the peer entity on the receiving side (in other words Receiver of the AM RLC protocol). According to this procedure, the Sender discards an RLC SDU that has not been successfully transmitted for a period of time or for a number of transmissions, and sends a Move Receiving Window (MRW) SUFI to the Receiver. According to the received MRW SUFI (which contains the sequence numbers of RLC PDUs to be discarded at the receiving side, because they contain only fragments of the discarded SDU) the Receiver discards the AMD PDUs carrying that SDU and updates the reception window, i.e. advances the lower edge of the reception window such that the sequence numbers of the RLC PDUs, which contained fragments of the discarded SDU are no longer within the reception window.

If the STATUS PDU containing an MRW SUFI transmitted in the downlink overtakes RLC Data PDUs sent before this STATUS PDU, the following holds for the RLC Data PDUs that were overtaken: Either some of them are equal to the RLC PDUs, which are to be discarded by means of the SDU discard procedure, or none of them are. Those, which are equal, will be discarded when received after the SDU discard procedure is finished, since the procedure will make sure that the sequence numbers of these RLC PDUs are outside the receiving window, if these RLC PDUs are received after the SDU Discard procedure is finished.

Hence, it suffices to only take care of the case that an RLC RESET PDU or an RLC RESET ACK PDU overtakes RLC Data PDUs.

Particular features of the HS-DSCH:

Since there is precisely one HS-DSCH transport channel, both logical channels can only be carried on (or as the standard says "be mapped to") the same HS-DSCH, i.e. from the perspective of the FEC, RLC Control PDUs and RLC Data PDUs are then treated the same, i.e. it is not possible to make sure that the FEC RLC Control PDUs are transmitted with better FEC than the RLC Data PDUs.

According to an exemplary embodiment of the present invention, RLC Control PDUs are transmitted together with RLC Data PDUs in a MAC-hs PDU, the error protection of which is better than the error protection of MAC-hs PDUs, which exclusively contain RLC Data PDUs. This improved error protection can be achieved by reducing the number of RLC PDUs contained in the MAC-hs PDU, whilst keeping the overall number of bits in the MAC-hs PDU after channel coding and rate matching constant, i.e. the same number of physical layer bits are sent over the air interface in the TTI of 2 ms.

MAC-hs PDUs may always be composed of RLC PDUs in such a way that there is no sequence alteration in the progression of the RLC PDUs transmitted in total in all MAC-hs PDUs. However, RLC Data PDUs may thereby be missing, since they could no longer be transmitted on account of unfavorable channel conditions, as the case may be.

The scheduler in MAC-hs on Node B may read the first bit of an RLC PDU of every RLC PDU received, in order to determine, whether it is an RLC Control PDU or an RLC data PDU.

Alternatively, RLC Control PDUs may be transmitted on a different logical channel to RLC Data PDUs and therefore the Frame Protocol for the transmission of data between the RNC and the Node B may determine from the respective logical channel, whether it comprises an RLC Control PDU or an RLC Data PDU, and may mark RLC Control PDUs in such a way that the Node B can immediately recognize, without analysis of the first bit of the RLC PDU, which of the received RLC PDUs is an RLC Control PDU and which is an RLC Data PDU.

According to another exemplary embodiment of the present invention, the entity in MAC-hs on the Node B, which builds the MAC-hs PDUs (e.g. the scheduler) makes sure that at least a given subset of the RLC Control PDUs such as the RESET PDU, the RESET ACK PDU and the STATUS PDU containing an MRW SUFI (Super Field) are sent in MAC-hs PDUs with better FEC. This may be advantageous, since these Control PDUs are usually rarely sent. In contrast to this e.g. STATUS PDUs containing a Status Report are sent more frequently, and restricting their transmission to smaller MAC-hs PDUs with very strong FEC might reduce the throughput of the downlink transmission via the HS-DSCH.

EXAMPLE

In practice, the method for improved FEC for RLC Control PDUs may be applied as follows: For RLC Data PDUs and RLC Control PDUs for an RLC machine on the SRNC, which sends data via the HS-DSCH to a mobile station, two logical channels are configured, whereby the first one is intended exclusively for the conveyance of RLC Control PDUs, and both logical channels have the same MAC logical priority (MLP). In the MAC-d layer, RLC Data PDUs and RLC Control PDUs thereby are put in MAC-d PDUs with different MAC headers. As a result of the same MAC priority, these RLC PDUs are gathered in the same queue within the MAC-d-layer, and then they are conveyed via the Frame Protocol between S-RNC and Node B, in the same sequence in which they were in the queue in the MAC-d layer, to the MAC-hs layer on Node B, where they—without altering the sequence—are stored in another queue until transmission via the HS-DSCH. When packing MAC-hs PDUs with MAC-d PDUs, which are temporarily stored in this queue, the scheduler in the MAC-hs layer analyzes each of these MAC-d PDUs, as to whether it belongs to that first logical channel pertaining to the conveyance of RLC Control PDUs of the RLC machine in question. In order to achieve a particularly robust modulation and coding scheme (MCS), which entails a particularly good FEC, the scheduler makes sure that the given MAC-d PDUs pertaining to the same MAC-hs priority class are inserted into the individual MAC-hs PDUs without altering the MAC-d PDU sequence, that MAC-d PDUs containing RLC Control PDUs only share a MAC-hs PDU with a small number of other MAC-d PDUs (or even are transmitted alone in a MAC-hs PDU), since in the case of a fixed number of coded bits, which are ultimately transmitted for a MAC-hs PDU after channel encoding and rate matching via the radio interface, the number of parity bits per user bit (which user bits are the bits of a first or second data packet) and thereby the FEC increases, as the number of user bits decreases.

If there are a great many RLC Control PDUs to be sent in the flow of a priority class, (for example not every hundredth but every tenth RLC PDU is a Control PDU), this may lead to the fact that, due to the constraint that the sequence of the MAC-d PDUs (which then contain RLC Control and RLC Data PDUs) must remain unaltered, only a small number of RLC Data PDUs per MAC-hs PDU are transmitted, but then with a significantly improved FEC, so that here, however, a reduction in the downlink throughput via the HS-DSCH may be anticipated. As a rule, however, the number of RLC Control PDUs represents only a very small fraction (e.g. 1%) of the RLC PDUs of an RLC machine to be transmitted, so that the flow rate is not significantly reduced by this measure.

On the other hand, this restriction of the downlink throughput can be circumvented, if only the important RLC Control PDUs (e.g. RLC RESET PDU, RLC RESET ACK PDU, RLC STATUS PDU with MRW SUFI or MRW_ACK SUFI) are carried via this first logical channel, the packets of which the scheduler includes in MAC-hs PDUs with stronger FEC, while the remaining RLC Control PDUs and the RLC Data PDUs are carried via the second logical channel. Since the important RLC Control PDUs are only very rarely sent, the restricting rule to incorporate the data units carried via the first logical channel only in MAC-hs PDUs with strong FEC and small size does not reduce the throughput noticeably.

Another possibility of enabling the entity for selecting MAC-d PDUs to be sent in the same MAC-hs PDU (e.g. the scheduler) to determine whether a MAC-d PDU contains an RLC Control PDU or an RLC Data PDU is to have it analyze the first bit of every single RLC PDU (which is contained in a MAC-d PDU within the queue in MAC-hs). This first bit an RLC PDU indicates whether it comprises an RLC Control PDU or an RLC Data PDU. Of course, this entity (e.g. the scheduler) can only determine this first bit of the RLC PDU error free, if it knows whether the MAC-d PDU, which contains the RLC PDU in question, was provided with a MAC header in the MAC-d layer or not, i.e. whether MAC multiplexing was applied for this logical channel or not. MAC multiplexing means here that several logical channels are multiplexed on the same MAC-d Flow. In this case, the MAC-d layer attaches a MAC header to the RLC PDU received by the RLC layer, in order to form the MAC-d PDU. This MAC header consists of 4 bits. The MAC header may be omitted, if precisely one logical channel is mapped onto an MAC-d Flow. In the example of this second case, in order to accurately identify the first bit of the RLC PDU, this entity (e.g. the scheduler) must therefore know whether a MAC-d Flow conveys precisely one logical channel or several logical channels. In the second case, a MAC header is always present, so that the scheduler must evaluate the fifth bit of the MAC-d PDU in order to determine whether it comprises an RLC Data PDU or an RLC Control PDU.

In the special case where the MAC-d Flow conveys precisely one logical channel the MAC header may be missing, so that here the first bit of a MAC-d PDU indicates whether the MAC-d PDU contains an RLC Data PDU or an RLC Control PDU. A less favorable configuration in this case might still contain it, so that the scheduler then must likewise be made aware of the fact, since it then has to evaluate the fifth bit of the MAC-d PDU in order to determine whether it comprises an RLC Data PDU or an RLC Control PDU.

In addition, the entity for selecting MAC-d PDUs to be sent in the same MAC-hs PDU has to know, which logical channels carry UM RLC PDUs, and which ones carry AM RLC PDUs. This can be achieved, e.g. by providing this entity with a list of all the logical channels which carry UM RLC PDUs. The same can be achieved by providing a list of all logical channels, which carry AM RLC PDUs, since it is only possible to configure transmission via the HS-DSCH for logical channels which transmit AM RLC PDUs or UM RLC PDUs. Furthermore, in order to distinguish between the important RLC Control PDUs and the less important RLC Control PDUs, so that this entity (e.g. the scheduler) can make sure that the important RLC Control PDUs (e.g. RLC RESET PDU, RLC RESET ACK PDU, STATUS PDU containing an MRW SUFI, STATUS PDU containing an MRW_ACK SUFI) has to know, which bit combinations of the "PDU Type" field (3 bits which follow the first bit, which determines that the RLC PDU is an RLC Control PDU) in the RLC Control PDU identify these important RLC Control PDUs. E.g. TS 25.322 prescribes the following mapping:

| Bit | PDU Type |
| --- | --- |
| 000 | STATUS |
| 001 | RESET |
| 010 | RESET ACK |
| 011-111 | Reserved (PDUs with this coding will be discarded by this version of the protocol). |

This mapping does not yet allow for identifying, whether the STATUS PDU contains an MRW SUFI or MRW SUFI_ACK. This information can be retrieved, by further analyzing the structure of the STATUS PDU, which structure is described in TS 25.322. An alternative could be to use two of the 5 reserved bit combinations to indicate that a STATUS PDU is contained, which includes an MRW SUFI or MRW SUFI_ACK field.

The above information may be made available to the entity deciding about which MAC-d PDUs to send within a MAC-hs PDU on the Node B as follows:

When setting up an AM logical channel, the data of which is to be carried via the HS-DSCH, the SRNC notifies, via an RNSAP-procedure, the DRNC one or more of these pieces of information, which the DRNC then forwards to the Node B by an NBAP procedure. RNSAP procedures and NBAP procedures, which are most suited for this, have the same name, and are called Radio Link Setup Procedure (the corresponding message sent from the SRNC to the DRNC or from the DRNC to the Node B is called "RADIO LINK SETUP")

Synchronized Radio Link Reconfiguration Preparation Procedure (the corresponding message sent from the SRNC to the DRNC, in case of the RNSAP, or from the DRNC to the Node B, in case of the NBAP, is called "RADIO LINK RECONFIGURATION PREPARE").

RNSAP (Radio Network System Application Part) is described in 3*GPP TS* 25.423 V 5.3.0 (2002-09), 3*rd Generation Partnership Project; Technical Specification Group Radio Access Network; UTRAN Iur Interface RNSAP Signalling* (Release 5).

NBAP (Node B Application Part) is described in 3GPP TS 25.433 V5.2.0 (2002-09), 3rd Generation Partnership Project; Technical Specification Group Radio Access Network; UTRAN Iub interface NBAP signalling (Release 5). The overall UTRAN architecture is described in 3GPP TS 25.401 V6.1.0 (2003-06) 3rd Generation Partnership Project; Technical Specification Group Radio Access Network; UTRAN overall description (Release 6). These specifications are herewith incorporated by reference.

Figure 3:
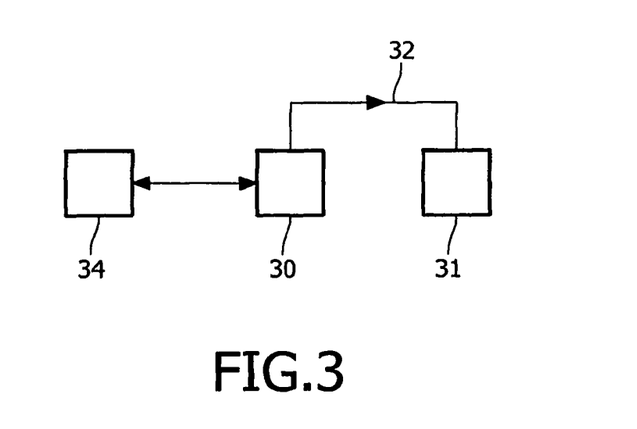
FIG. 3 shows a communication system according to an exemplary embodiment of the present invention.

FIG. 3 shows a communication system according to an exemplary embodiment of the present invention. The communication system comprises a transmitting station 30 with a network unit, a receiving station 31 and computing means 34. The computing means 34 is used for executing a software program product for performing a transmission of data packets from the transmitting station 30 to the receiving station 31. A transmission of data packets from the transmitting station 30 to the receiving station 31 may be performed via a wireless communication link 32. The receiving station 31 may also be provided with computing means. The transmission system depicted in FIG. 3 is adapted for performing an improved FEC according to an exemplary embodiment of the present invention.

Figure 4:
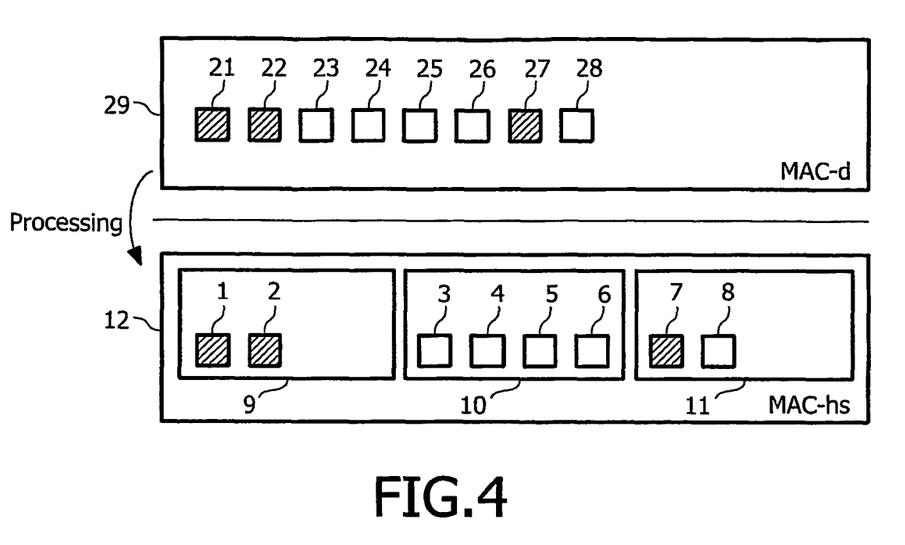
FIG. 4 shows a schematic representation of a method according to an exemplary embodiment of the present invention.

FIG. 4 shows a schematic representation of a method according to an exemplary embodiment of the present invention. As has been described with reference to FIGS. 1 and 2 in detail, the MAC-d layer 29 comprises first data packets or MAC-d PDUs, which contain RLC Control PDUs 21, 22, 27 and second data packets or MAC-d PDUs, which contain RLC Data PDUs 23, 24, 25, 26 and 28, where RLC Control PDUs and RLC data PDUs were sent by the same RLC entity in the layer above the MAC-d layer. In a processing step, the MAC-d PDUs containing RLC PDUs 21, 22, 23, 24, 25, 26, 27 and 28 are handed over to the MAC-hs layer 12, which builds MAC-hs PDUs 1, 2, 3, 4, 5, 6, 7 and 8 from the MAC-d PDUs.

First containers 9, 11 comprise MAC-d PDUs 1, 2 and 7, which comprise control information (RLC Control PDUs), and first container 11 also comprises MAC-d PDU 8, which comprises data (RLC Data PDU). On the other hand, second container 10 comprises only MAC-d PDUs 3, 4, 5, 6, which only comprise data, and no PDUs comprising control information.

It should be noted that MAC-hs PDUs may always be composed of MAC-d PDUs (which always contain exactly one RLC PDU) in such a way that in the progression of the RLC PDUs transmitted in all the MAC-hs PDUs actually sent, there is no sequence alteration. However, in the MAC-hs PDUs actually sent, RLC Data PDUs may be missing, since due to bad channel conditions, the error protection of the MAC-hs PDU, in which these RLC Data PDUs (contained in MAC-d PDUs) were carried may not have been as strong as the error protection of the MAC-hs PDU that carried RLC Control PDUs (contained in MAC-d PDUs).

In order to provide for a correct sequential order of the first and second data packets, at least the second data packets may be, according to an exemplary embodiment of the present invention, provided with a corresponding data packet sequence number. Furthermore, in order to provide a correct sequential order of the first and second containers, the first and second containers may be provided with a corresponding container sequence number.

According to another exemplary embodiment, of the present invention which may be implemented in combination with the exemplary embodiment set forth in claim 1, i.e. in combination with containers having different error coding, but may also be implemented separately to the solution of claim 1, the described problem may be solved by modifying the RLC protocol in such a way that after the RLC RESET procedure is finished, the transmitting and receiving windows are not initialized such that their lower edges are equal to the sequence number 0, but that the lower edge of these windows is set equal to the lower edge of the transmitting window immediately before the RLC RESET procedure is initiated. By that, it may be accomplished that the "orphan RLC PDUs" are always outside the receiving RLC window after the RESET procedure, and hence are discarded according to the error handling of the RLC protocol. In other words, RLC data PDUs, the sequence numbers of which are outside the receiving window, are discarded.

Figure 5:
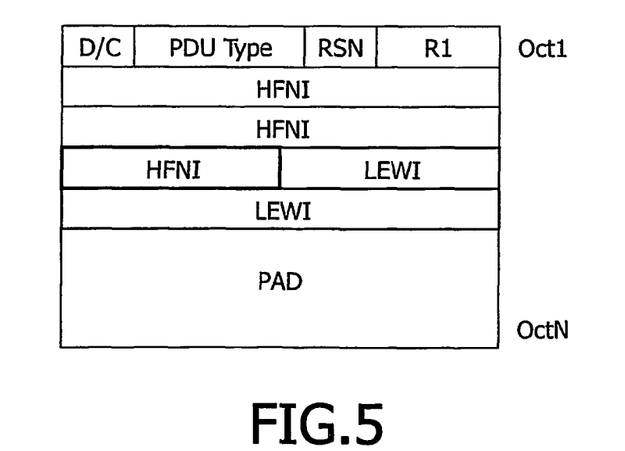
FIG. 5 shows an exemplary embodiment of a modification of the RLC RESET PDU and RLC RESET ACK PDU as currently contained in TS 25.322, in which a part of the padding field may be used according to an aspect of the present invention.

This modification of the RLC protocol can be achieved by incorporating in the RLC RESET PDU a further field of 12 bit, which contains the value of the lower edge of the transmitting window immediately before the RLC RESET PDU is sent and thus triggers the RLC reset procedure (i.e. without initializing the lower edge of the transmission window to 0). When the receiving RLC entity receives this RLC RESET PDU, it reads also this field, and updates its receiving window such that its lower edge equals the value contained in this field. Likewise, the RLC entity, which receives the RLC RESET PDU, includes in the RLC RESET ACK PDU to be send in reply to the RLC RESET PDU, a further field of 12 bit, which contains the value of the lower edge of its transmitting window immediately before it sends the RLC RESET ACK PDU, and keeps its transmission window, i.e. does not initialize the lower edge of the transmission window to 0. When the RLC RESET ACK PDU is received by the RLC entity, that triggered the RLC RESET procedure by sending the RLC RESET PDU, it reads the field of 12 bits, which contains the lower edge of the transmission window of the RLC entity that sent the RLC RESET ACK PDU, and updates its own receiving window such that its lower edge equals the value contained in this field. Hence, in the RESET PDU and RESET ACK PDU as described in TS 25.322 e.g. after the HFNI (hyper frame number indicator) field, a further 12 bit field may be added, which takes 12 bits of the padding field as shown in FIG. 5. LEWI ("Lower Edge of the Window"-Indicator) denotes the new field, while the others are those described in TS 25.322.

According to this exemplary embodiment it may then be possible to send RLC Control PDUs on a logical channel with higher priority than the logical channel used for RLC Data PDUs, since RLC Control PDUs, which overtake RLC Data PDUs may no longer cause problems. Better FEC of RLC Control PDUs compared with RLC Data PDUs can then be obtained by the fact that RLC Control PDUs are collected in MAC-hs on Node B in a different queue than that of RLC Data PDUs, which queue is served by the scheduler with higher priority, and where the scheduler can ensure that the container or MAC-hs PDU used to carry the RLC Control PDUs stored in this queue is protected with a sufficiently strong FEC, i.e. contains a sufficiently reduced number of RLC Control PDUs in order to achieve this strong FEC.

It should be noted that, in spite of the fact that the present invention has been described with reference to an exemplary embodiment of an UMTS system, the present invention may also be applied to other systems with similar problems and of a similar arrangement.

The invention claimed is:

1. A data transmitting method comprising:
    transmitting first data packets and second data packets from a transmitting station to a receiving station in containers;
        wherein the first data packets comprise first data, in particular control instructions; wherein the second data packets comprise second data; wherein a first container comprises at least one first data packet;
    providing the first container with a first error coding;
        wherein a second container comprises at least one second data packet and no first data packet; and
    providing the second container with a second error coding;
        wherein the first error coding is stronger than the second error coding;

wherein the number of first and second data packets in the first container is smaller than the number of second data packets in the second container such that a first data payload transmitted in the first container is lower than a second data payload transmitted in the second container.

2. The method of claim 1, further comprising the steps of: controlling by a first retransmission protocol a transmission and retransmission of a third data packet of the first and second data packets;

controlling by a second retransmission protocol a transmission and retransmission of the first and the second containers;

providing the first container and the second container with a corresponding container sequence number; and providing each data packet of the second data packets with a corresponding data packet sequence number; wherein a first order of the first and second data packets which results when the first and second data packets are sent in first and second containers remains unchanged compared with a second order of the first and second data packets with which the first and second data packets are received by the second retransmission protocol.

3. The method of claim 2, wherein the second retransmission protocol determines whether a fourth data packet, which the second retransmission protocol receives from the first retransmission located above the second retransmission protocol, is a first data packet or a second data packet.

4. The method of claim 3, wherein the second retransmission protocol performs the determination whether the fourth data packet is a first data packet or a second data packet by analyzing a header information, which is associated with the fourth data packet by the first retransmission protocol.

5. The method of claim 3, wherein, if the fourth data packet is a first data packet, the fourth data packet is labeled when carried from a first transmission protocol to a second transmission protocol, which first transmission protocol is located above the second transmission protocol.

6. The method of claim 1, wherein the method is applied for data transmission over the High Speed Downlink Shared Channel in Universal Mobile Telecommunications System (UMTS).

7. The method of claim 6, wherein the first data packets are Radio Link Control (RLC) Control Protocol Data Units (PDUs); and herein the second data packets are RLC Data PDUs.

8. The method of claim 1, further comprising the steps of: controlling by a first retransmission protocol a transmission and retransmission of a third data packet of the first and second data packets;

controlling by a second retransmission protocol a transmission and retransmission of the first and the second containers;

providing the first container and the second container with a corresponding container sequence number;

providing each data packet of the second data packets with a corresponding data packet sequence number; and discarding by the receiving entity of the first retransmission protocol second data packets, the sequence number of which is outside a receiving window, wherein a first peer entity of two peer entities of the first retransmission protocol is adapted to initiate a reset of both peer entities, which reset is done by means of a first and second reset message included in the first data packets, which reset causes the first entity to send a first reset message to the second entity, and the second entity to send a second reset message to the first entity in reply to the first reset message, which first reset message sets the lower edge of the receiving window of the second entity equal to the lower edge of the transmission window of the first entity, which lower edge was used before the reset, which second reset message sets the lower edge of the receiving window of the first entity equal to the lower edge of the transmitting window of the second entity, which lower edge was used before the receipt of the first reset message.

9. A communication system comprising:

means for transmitting first data packets and second data packets from a transmitting station to a receiving station, wherein the first data packets comprise first data, in particular control instructions; wherein the second data packets comprise second data; wherein the first data packets and the second data packets are transmitted from the transmitting station to the receiving station in containers; wherein a first container comprises at least one first data packet;

means for providing the first container with a first error coding; wherein a second container comprises at least one second data packet and no first data packet; and means for providing the second container with a second error coding; and wherein the first error coding is stronger than the second error coding; wherein the number of first and second data packets in the first container is smaller than the number of second data packets in the second container such that a first data payload transmitted in the first container is lower than a second data payload transmitted in the second container.

10. A transmitting station comprising:

means for transmitting first data packets and second data packets to a receiving station, wherein the first data packets comprise first data, in particular control instructions; wherein the second data packets comprise second data; wherein the first data packets and the second data packets are transmitted from the transmitting station to the receiving station in containers; wherein a first container comprises at least one first data packet;

means for providing the first container with a first error coding; wherein a second container comprises at least one second data packet and no first data packet; and means for providing the second container with a second error coding; and wherein the first error coding is stronger than the second error coding; wherein the number of first and second data packets in the first container is smaller than the number of second data packets in the second container such that a first data a load transmitted in the first container is lower than a second data payload transmitted in the second container.

11. A receiving station comprising:

means for receiving first data packets and second data packets from a transmitting station, wherein the first data packets comprise first data, in particular control instructions; wherein the second data packets comprise second data; wherein the first data packets and the second data packets are transmitted from the transmitting station to the receiving station in containers; wherein a first container comprises at least one first data packet;

means for providing the first container with a first error coding; wherein a second container comprises at least one second data packet and no first data packet; and means for providing the second container with a second error coding; and wherein the first error coding is stronger than the second error coding; wherein the number of first and second data packets in the first container is smaller than the number of second data packets in the second container such that a first data payload transmitted in the first container is lower than a second data payload transmitted in the second container.

12. A software program product storing a set of instructions configured for being executed by at least one processor for performing a method comprising the steps of:

transmitting first data packets and second data packets from a transmitting station to a receiving station, wherein the first data packets comprise first data, in particular control instructions; wherein the second data packets comprise second data; wherein the first data packets and the second data packets are transmitted from the transmitting station to the receiving station in containers; wherein a first container comprises at least one first data packet;

providing the first container with a first error coding; wherein a second container comprises at least one second data and no first data packet; and providing the second container with a second error coding; and wherein the first error coding is stronger that the second error coding; wherein the number of first and second data packets in the first container is smaller than the number of second data packets in the second container such that a first data payload transmitted in the first container is lower than a second data payload transmitted in the second container.

* * * * *